3,323,388
DIFFERENTIAL TRANSMISSION HAVING PILOTED OUTPUT SHAFTS

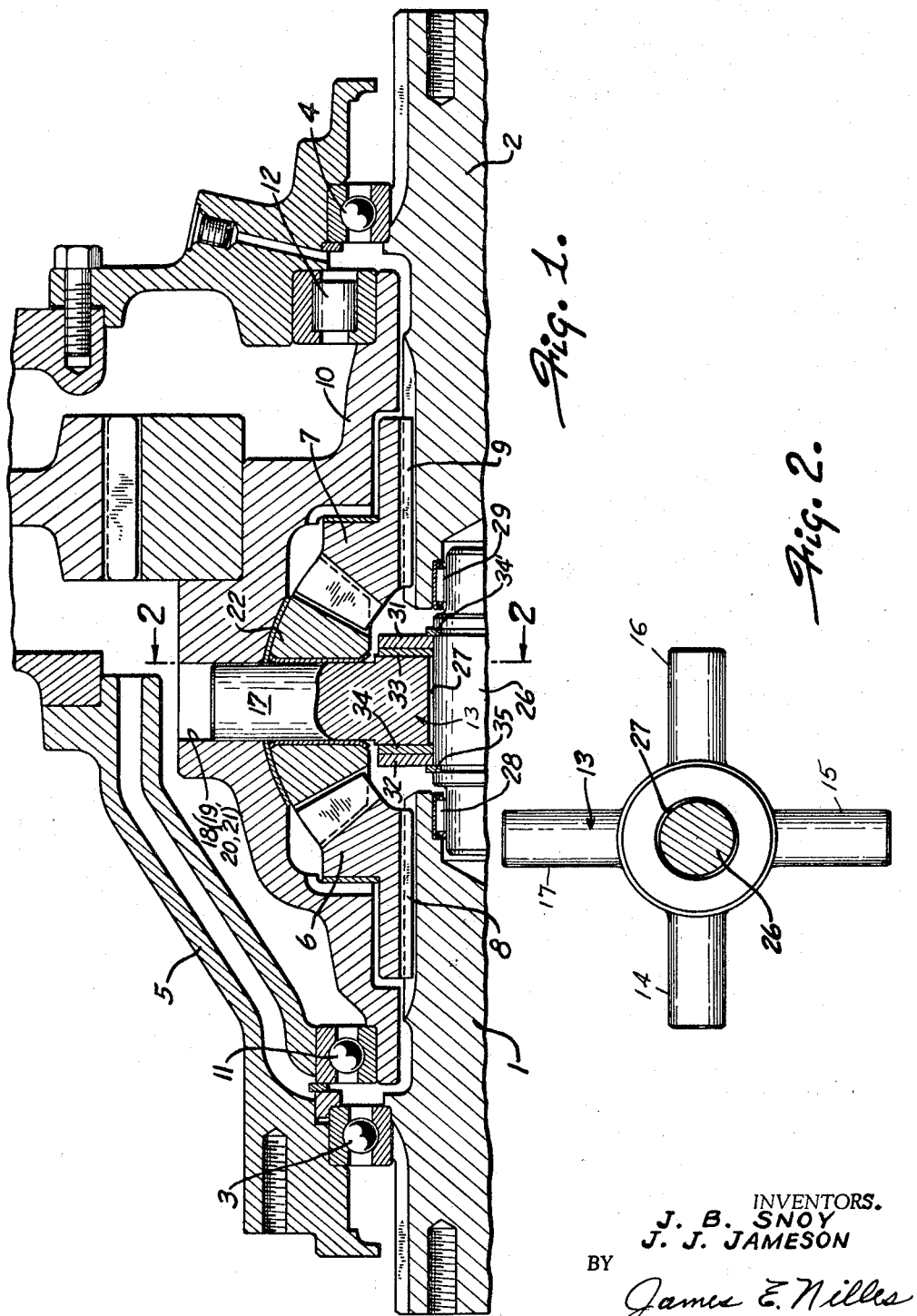

Joseph B. Snoy and James J. Jameson, Rockford, Ill., assignors to Twin Disc Clutch Company, Racine, Wis., a corporation of Wisconsin
Filed July 30, 1965, Ser. No. 475,968
4 Claims. (Cl. 74—710)

This invention relates to differential power drive transmissions of the type having a pair of axially aligned power shafts which extend in opposite directions and which are used to divide the power received into the transmission into two separate lines. The invention finds particular but not exclusive utility in center differentials, that is to say, those which are located in the generally central portion of the vehicle and which split the power to the front and to the rear of the vehicle.

In the conventional bevel side gear type of differentials such as are utilized in automobiles and trucks, and particularly those which are used in the axle itself of such vehicles, the radial forces on the side gears are usually relatively small because of the length of the axle itself from the side gear to the ground wheel where the forces are actually developed. In differentials of the type to which the present invention pertains, it is undesirable to fixedly locate the inner ends of the output shafts because the center of the inner ends of the shafts do not necessarily coincide with the most desirable position of the shafts when the latter are rotating. Because the apparent operating center of rotation of the output shaft may not coincide with the operating center of rotation as established by the anti-friction bearing in which the shaft is mounted, forces of considerable and uncalculable magnitude are developed, thus not only causing bearing failure, but very often causing cracking of the differential case itself.

This problem is particularly prevalent in differentials of the type wherein the output shafts are comparatively small in length; in other words, where the effective lever arm is rather short. Such a lever arm is found in transfer cases of the type previously mentioned and which are located intermediate the length of the vehicle and for the purpose of distributing the power both to the rear and to the front of the vehicle. In these instances, very high radial forces are developed on the side gears at the inner ends of the output shafts within the differential and the inner ends of the shafts flail about in an eccentric manner and with a "cranking" effect.

Accordingly, the present invention provides an improved differential power drive transmission of the above general type wherein a floating shaft is located between the adjacent inner ends of the two oppositely extending and axially aligned output shafts. The adjacent inner ends of the output shafts are rotatably mounted or piloted on the ends of this floating shaft. The floating shaft in turn extends through the four-legged cross on which the bevel pinions are mounted and friction means are interposed between the floating shaft and the cross, and by means of which the floating shaft is permitted to radially shift within the cross upon application of radial forces on the inner ends of the output shafts above a predetermined magnitude. This permissible radial shifting of the floating shaft consequently causes radial repositioning of the inner ends of the output shafts whereby the inner ends seek their proper operating position in a radial direction. The friction means acts to hold the inner ends of the output shaft in their proper operating position once it has been established and acts to dampen the vibrations which are set up at high speeds of the output shafts due to unbalance, for example, in the drive lines. The bevel or side gears which are mounted on the inner ends of the output shafts are actually centered by the meshing forces of engagement with the bevel pinions on the cross; in other words, the floating shaft is forced to the operating center of rotation of the side gears, upon initial application of a heavy operating load on the side gears; the floating shaft will then support any radial loads imposed from the outside up to the frictional capacity or limit of the unit.

These and other objects and advantages of the present invention will appear hereinafter as this disclosure progresses, reference being had to the accompanying drawings in which FIGURE 1 is a longitudinal cross sectional view through a differential transmission embodying the present invention, and FIGURE 2 is a transverse cross sectional view taken along line 2—2 in FIGURE 1.

Referring in greater detail to the drawings, a pair of axially and concentrically aligned output shafts 1 and 2 are rotatably mounted on anti-friction bearing assemblies 3 and 4, respectively, within the differential housing 5. It will be noted that the outer ends of the output shafts extend outwardly from the housing and in opposite directions. The inner ends of the output shafts are located within the housing and adjacent to one another. A side or bevel gear 6 and 7 are fixed by splines 8 and 9, respectively, to the inner ends of their respective shafts 1 and 2. Thus the bevel gears are fixed to their respective shafts for rotation therewith.

A differential case 10 is rotatably mounted within the housing and about the same axis as that of the shafts 1 and 2. This case is supported on the anti-friction bearing assembly 11, and the roller bearing assembly 12 in the housing.

A cross 13 having four legs 14, 15, 16 and 17, arranged in right-angular relationship with one another, is located between the adjacent ends of the output shafts, and is mounted by its legs in the respective bores 18, 19, 20 and 21 in the case. It should be noted that the cross is incapable of any radial shifting in respect to the case, and will rotate with the case as a unit. A bevel pinion 22 is rotatably mounted on each of the legs of the cross and are in constant mesh with the bevel gears 6 and 7.

A floating shaft 26 extends through the bore 27 in the cross, which bore is of greater diameter than the external diameter of the shaft 26, so that the shaft can shift radially within the bore to a certain extent. The inner ends of the output shafts are suitably journalled or piloted on the corresponding ends of the floating shaft by means of the anti-friction, needle bearing assemblies 28 and 29. Thus, any radial shifting of the floating shaft 26 will consequently result in similar radial shifting of the inner ends of the output shafts.

Friction means are interposed between the floating shaft and the cross 13 which results in the ability of the floating shaft to shift radially when a radial force of predetermined magnitude is applied through the inner ends of the output shafts. This friction means comprises a pair of Belleville springs 31 and 32, one being mounted on either side of the central portion of the cross. Between each of the Belleville springs and the cross is a wear washer 33 and 34, respectively, and these washers can be made of various materials to provide the controllable co-efficient of friction and a low wear rate. For example, a material of bronze has proved to be particularly effective for this purpose, but other material such as a fiber or a sintered product may be utilized. A pair of snap rings 34' and 35 on the floating shaft act to hold the Belleville spring compressed, and the amount of compression of the springs and the co-efficient of friction of the wear washers are chosen so that the floating shaft can be forced in a radial direction by a load which is within the load rating of the anti-friction bearing assemblies 28 and 29.

The amount of compression of the Belleville springs, that is to say, the frictional holding ability of this friction means located between the floating shaft and the cross, is thus predetermined for the unit, and will, of course, vary, depending on the size, type and load carrying ability of the anti-friction bearing assemblies 28 and 29.

With the present invention, upon the application of the initial operating load, the bevel gears 6 and 7 will be forced against the holding effect of the friction means to the operating center of rotation of the bevel gears. Thus the operating centers of the inner ends of the output shafts will be properly determined and held against any radial loads imposed thereon from the outside up to the pre-determined extent of the holding ability of the friction means. The present invention acts to prevent "cranking" of the inner ends of the output shafts and relieves and prevents the high radial forces which would otherwise develop and which have heretofore resulted in considerable damage to such a differential transmission. The present invention provides a means for dampening the vibrations that are often set up at high speeds on the output shafts and yet does not rigidly fix the inner ends of these shafts.

Various modes of carrying out the invention are contemplated as being within the scope of the following claims particularly pointing out and distinctly claiming the subject matter which is regarded as the invention.

What is claimed is:

1. A differential power drive transmission comprising, a housing, a pair of axially and concentrically aligned output shafts rotatably mounted within said housing and each having an inner end adjacent one another within said housing, a bevel gear fixed on the inner end of each shaft, a differential case rotatably mounted within said housing about the axis of said shafts, a cross including a plurality of radially extending legs and mounted within said case for rotation therewith and located between said output shafts, a bevel pinion rotatably mounted on each of said legs and in constant mesh with said bevel gears, a floating shaft extending through said cross and located in axial alignment with and between said output shafts, the ends of the floating shaft being rotatably piloted with the respective adjacent ends of the output shafts, and friction means between said floating shaft and said cross to permit controlled radial shifting of said floating shaft in said cross and consequent radial positioning of the inner ends of said output shafts when the radial forces thereon exceed a predetermined amount.

2. A differential power drive transmission comprising, a housing, a pair of axially and concentrically aligned output shafts rotatably mounted within said housing in end-to-end relationship and each having an outer end extending from said housing, said shafts each having an inner end adjacent one another within said housing, a bevel gear on the inner end of each shaft for rotation therewith, a differential case rotatably mounted within said housing about the axis of said shafts, a cross having four legs extending at right angles to one another, and mounted within said case for rotation therewith and located between said output shafts, a bevel pinion rotatably mounted on each of said legs and in constant mesh with said bevel gears, a floating shaft extending through said cross and located in axial alignment with and between said output shafts, the ends of the floating shaft being rotatably piloted with the respective adjacent ends of the output shafts, and friction means between said floating shaft and said cross to permit controlled radial shifting of said floating shaft in said cross and consequent radial positioning of the inner ends of said output shafts when the radial forces thereon exceed a predetermined amount.

3. Differential transmission mechanism comprising, a housing, a pair of axially and concentrically aligned output shafts rotatably mounted within said housing in end-to-end relationship and each having an outer end extending from said housing, said shafts each having an inner end adjacent one another within said housing, a bevel gear on the inner end of each shaft for rotation therewith, a differential case rotatably mounted within said housing about the axis of said shafts, a cross having four legs extending at right angles to one another, and mounted within said case for rotation therewith and located between said output shafts, a bevel pinion rotatably mounted on each of said legs and in constant mesh with said bevel gears, a floating shaft extending through said cross and located in axial alignment with and between said output shafts, the ends of the floating shaft being rotatably piloted with the respective adjacent ends of the output shafts, and friction means including Belleville springs which are compressed between said floating shaft and said cross to permit controlled radial shifting of said floating shaft and consequent radial positioning of the inner ends of said output shafts, when the radial forces thereon exceed a predetermined amount and to otherwise prevent vibration of said ends of said shafts.

4. Mechanism as defined in claim 3 including friction washers between said springs and cross.

References Cited

UNITED STATES PATENTS

| | | | |
|---|---|---|---|
| 2,490,146 | 12/1949 | Miller | 74—711 |
| 2,548,258 | 4/1951 | Griffith | 74—713 |
| 3,053,114 | 9/1962 | Singer | 74—710.5 |

DAVID J. WILLIAMOWSKY, *Primary Examiner.*

C. J. HUSAR, *Assistant Examiner.*